United States Patent
Kieras

(10) Patent No.: US 6,588,178 B1
(45) Date of Patent: Jul. 8, 2003

(54) METHOD OF FORMING PLASTIC TUBES WITH ORIENTED LABELING

(75) Inventor: Ronald E. Kieras, Woodstock, IL (US)

(73) Assignee: Thatcher Tubes LLC, Woodstock, IL (US)

( * ) Notice: Subject to any disclaimer, the term of this patent is extended or adjusted under 35 U.S.C. 154(b) by 106 days.

(21) Appl. No.: 09/771,190

(22) Filed: Jan. 26, 2001

(51) Int. Cl.$^7$ .............................. B65B 7/28; B65B 61/28
(52) U.S. Cl. ......................................... 53/415; 53/490
(58) Field of Search ............................... 53/415, 131.5, 53/456, 490; 215/235, 237; 222/107; 206/459.5; 40/310

(56) References Cited

U.S. PATENT DOCUMENTS

| | | | |
|---|---|---|---|
| 4,854,473 A | * 8/1989 | Dubach | 215/235 |
| 5,123,745 A | * 6/1992 | Augur | 40/310 |
| 5,143,234 A | 9/1992 | Lohrman et al. | 215/235 |
| 5,289,930 A | * 3/1994 | Inouye | 215/235 |
| 5,582,328 A | * 12/1996 | Brown | 222/107 |
| 5,758,440 A | * 6/1998 | Yudin | 40/310 |
| 5,775,386 A | * 7/1998 | Connan | 141/113 |
| 5,806,698 A | 9/1998 | Aguirrezabal | 215/235 |
| 6,129,802 A | * 10/2000 | Key | 40/310 |

* cited by examiner

Primary Examiner—John Sipos
(74) Attorney, Agent, or Firm—Armstrong, Westerman & Hattori, LLP

(57) ABSTRACT

Squeezable plastic tubes which have a flip-top closure cap with a finger recess are provided by a method which aligns indicia on labeling of the tube with the finger recess, the labeling being either a wrap-around label or a label applied on the front and/or back wall of the tube. The indicia is centered on or opposite to a visually desired graphics portion of the label. The closure cap is applied to a collapsible plastic cylinder followed by applying a label such that the indicia is aligned with or opposite to an imaginary surface line which is parallel with the longitudinal axis of the cylinder and passes through the center of the finger recess of the closure cap. The open end of the plastic cylinder, after filling the cylinder with contents to be dispensed therefrom, is sealed in a direction perpendicular to a plane defined by the center of the finger recess and the longitudinal axis, by alignment of sealing means with the indicia, to form a filled squeezable plastic tube.

16 Claims, 2 Drawing Sheets

METHOD OF FORMING PLASTIC TUBES WITH ORIENTED LABELING

Squeezable plastic tubes are used in large quantities for the packaging and dispensing of various products, such as cosmetics, ointments, shampoo, toothpaste, and the like. Such tubes are usually provided empty to the producer of the contents which the tube is meant to contain, with an open end for filling of the tube and a closed opposite end, that end closed by a closure cap. The producer then fills the tube and seals the open end to provide a filled tube for use by a consumer by removing or opening the closure cap and dispensing contents by squeezing of the tube.

A particularly useful closure cap for use with squeezable plastic tubes is the "flip-top" cap which has a lower section that is attached to a tube, the lower section having a dispensing nozzle, and an upper section that is hinged to the lower section, and usually has a plug for closing the dispensing nozzle when the upper and lower sections are closed. A finger or thumb recess is provided in the lower section of the closure cap, opposite the hinge, so that a user's finger or thumb can be used to push the upper section away from the lower section and expose the nozzle for dispensing of the contents of the tube by squeezing of the tube.

While the squeezable tubes are originally in a cylindrical shape before sealing of the tube, upon sealing of the open end of the tube, such as by welding, while the top of the tube retains a substantially cylindrical shape, adjacent to the head, the remaining portion of the tube assumes a shape of an isosceles triangle, when viewed from a side, with two relatively flat front and rear walls and rounded sides. Labeling for product identification and use directions is usually printed or otherwise provided so that the product identification and use directions appear on the relatively flat front and rear walls. Where a flip-top closure cap is used, it is advantageous to align the finger recess of the closure cap with a visually desired graphics portion of the labeling, such as the brand name, so that portion of the label is visible to the user when holding the tube across the flat surfaces, so as to provide easy opening of the flip-top closure cap.

It is thus advantageous that the finger recess of a flip-top closure cap and the visually desired graphics portion be aligned, while the other end of the tube is sealed in a direction perpendicular to a plane, defined by a center of the finger recess and the longitudinal axis of the cylindrical tube, so as to provide the proper alignment. Various methods have been proposed to assume such alignment, such as providing co-acting ribs or projections on a cap and tube head which engage when proper alignment is achieved, such as is described in U.S. Pat. No. 5,143,234. Such a method requires modification of the cap and head however, with the expense and labor associated with such designs.

It is an object of the present invention to provide a method of forming a squeezable plastic tube that has a flip-top closure cap where the visually desired graphics portion of the labeling and finger recess of the cap are aligned, and with the tube sealed in a direction perpendicular to a plane, defined by the center of the finger recess and the longitudinal axis of the cylindrical tube such that the labeling and finger recess are properly positioned during squeezing of the tube by a user, without the need for specially designed cap and tube head arrangements.

SUMMARY OF THE INVENTION

Squeezable plastic tubes for dispensing material which have a hinged closure cap with a finger recess, with a visually desired graphics portion of the labeling centrally aligned relative to the finger recess, are produced by providing a collapsible elongated plastic cylinder, having an outer surface, with a head at one end and being open at the other end, the head having a conventional engagement feature for engagement with the hinged closure cap. The closure cap is secured on the head, which closure cap has a lower portion attached to the head and an upper portion hingedly attached to the lower portion, and a finger recess in the outer wall of the lower portion opposite the hinge. Then, labeling is applied to the outer surface of the collapsible elongated plastic cylinder between the open end and the closure cap, the labeling having a visually desired graphic portion and an indicia centered on or opposite of such visually desired graphic portion. The indicia on the label is aligned with, or is opposite, to an imaginary surface line on the plastic cylinder which is parallel with the longitudinal axis of the cylinder and passes through a center of the finger recess of the closure cap.

The labeling may be applied to the outer surface of the collapsible plastic cylinder on a wall thereof with the indicia aligned with the recess of the closure cap (the front of a tube produced), on the outer surface of the collapsible plastic cylinder on a wall thereof with the indicia opposite to the recess of the closure cap (the back of a tube produced) or the label may be a wrap-around label that is applied completely around the cylinder outer surface with the indicia aligned with the recess of the closure cap or opposite the recess of the closure cap.

The open end of the collapsible elongated plastic cylinder, after filling of the plastic cylinder with contents to be dispensed therefrom, is arranged to be sealed in a direction perpendicular to a plane, defined by the center of the finger recess and the longitudinal axis of the cylindrical tube, by sealing of the open end of the filled collapsible elongated plastic cylinder with use of the indicia to provide for the proper arrangement.

BRIEF DESCRIPTION OF THE DRAWINGS

The present method will now be explained with reference to the accompanying drawings wherein like numerals indicate like parts throughout the drawings, and wherein.

DETAILED DESCRIPTION

The present invention provides a method of forming a squeezable plastic tube for dispensing material, the tube having a flip-top closure cap with a hinge, and a finger recess in a lower portion of the closure cap, where the finger recess and indicia on the labeling are aligned with or opposite to each other and the tube is arranged to be sealed perpendicular to a referencing plane defined by a center of the finger recess and the longitudinal axis of the cylinder, so as to provide for a desired visual positioning of the labeling of the sealed tube when the hinged closure cap is being opened and the tube is being squeezed by a user.

Figure 1:
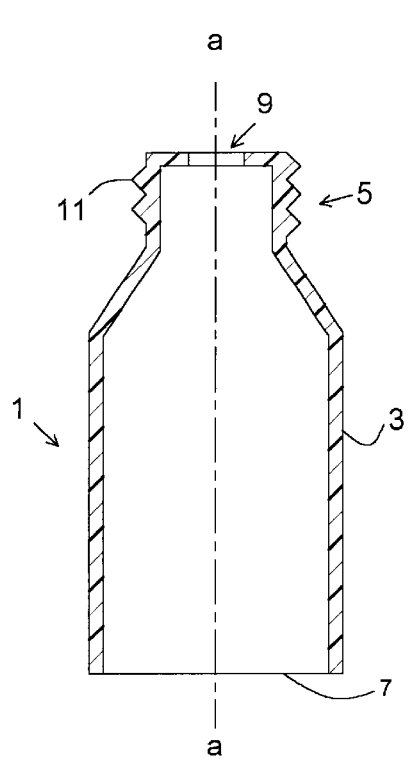
FIG. 1 is a cross-sectional view of a collapsible plastic cylinder with a head for use in forming a tube of the present invention.

Referring now to the drawings, FIG. 1 shows a cross-sectional view of a collapsible plastic cylinder 1, having an outer surface 3, and a head 5 at one end, with the other end 7 of the cylinder open. The head 5 has a dispensing aperture 9 and securement means, such as threads 11, for attachment of a closure cap to the head 5. The collapsible plastic cylinder is formed from various thermoplastic materials. Such thermoplastic materials include, but are not limited to, high density polyethylene, low density polyethylene, polypropylene, a polyester such as polyethylene terephthalate, polycarbonates, polyvinyl chloride, and the like.

The collapsible plastic cylinder may also be formed from multi layers or laminates of various plastic materials, such as a layer of an oxygen-impermeable material comprising a polyamide such as nylon, or ethylene polyvinyl alcohol, a polyvinylidene chloride or the like sandwiched between two polyethylene outer layers. Also, five layer composites, comprising outer layers of a thermoplastic such as polyethylene, polypropylene, a polyester such as polyethylene terephthalate, an inner layer of an oxygen-impermeable material, and adhesive layers between the oxygen-impermeable material and each outer layer of thermoplastic to bond the same can be used.

The collapsible plastic cylinder 1 is thus formed from a flexible material and is readily squeezable and collapsible to force the contents of the filled tube out of the dispensing aperture 9 formed in the end of the cylinder at the head portion. The cylinder is generally of a size having a wall thickness of the cylindrical portion of between about 0.010 to 0.040 inch in thickness, while a head portion of the tube is thicker than the wall of the cylinder, generally between 0.035 to 0.045 inch thick.

Figure 2:
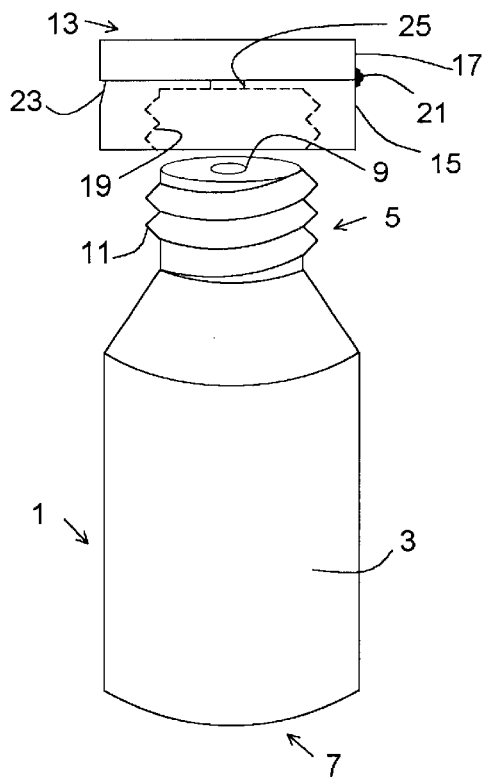
FIG. 2 is a perspective view of the collapsible plastic cylinder of FIG. 1 with a closure cap positioned for securement thereto.
Figure 3:
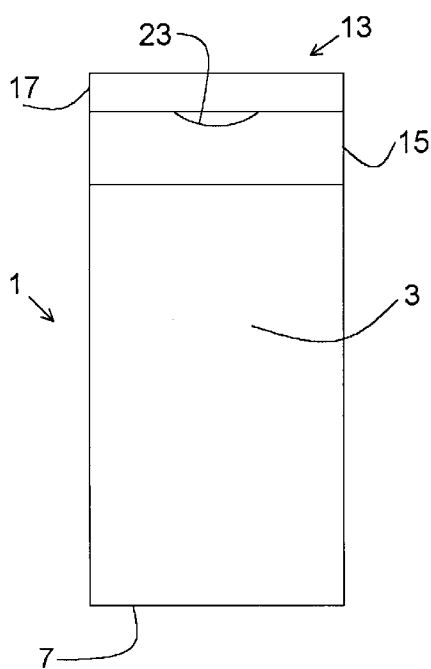
FIG. 3 is a side-elevational view of a closure cap secured to the collapsible plastic cylinder of FIG. 1.

In FIG. 2, a collapsible plastic cylinder 1 is shown with a closure cap 13 in position for securement to the head 5 of the collapsible plastic cylinder 1. The closure cap 13 has a lower portion 15 and an upper portion 17, with securement means, such as threads 19, on a lower portion 15 thereof, which mate with the threads 11 on the head 5 of the collapsible plastic cylinder 1. The lower portion 15 and upper portion 17 of the closure cap 13 are connected by a flexible hinge 21. Opposite the flexible hinge 21, a finger recess 23 is provided in the lower portion 15 of the closure cap 13 that enables a user to open the closure cap by upward pressure against the upper portion 17 through a finger or thumb sliding upward in the finger recess 23. The lower portion 15 of the closure cap 13 has a dispensing orifice 25 which cooperates with dispensing aperture 9 of the collapsible plastic cylinder, and the upper portion 17 of the closure cap 13 has a plug or projecting fitment 27 (FIG. 7) which seals the dispensing orifice 25 when the two portions 15, 17 of the closure cap 13 are in closed position. A collapsible plastic cylinder 1 is shown in FIG. 3 with a closure cap 13 secured thereto to close the head 5 end of the cylinder while the other end remains open as shown at 7.

Figure 4:
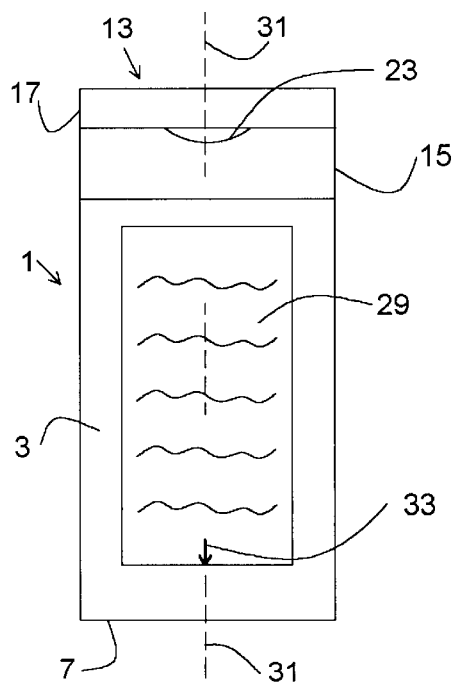
FIG. 4 is a view similar to FIG. 3 showing a label applied to the collapsible plastic cylinder, centrally aligned with the finger recess of the closure cap.

After securing the closure cap 13 on the head 5 of the collapsible plastic cylinder 1, labeling 29 is applied to the outer surface 3 of the collapsible plastic cylinder 1. As illustrated in FIG. 4, the labeling 29 is applied to the outer surface 3 of the collapsible plastic cylinder 1 between the closure cap 13 and the open end 7. The plastic cylinder has an imaginary surface line 31 which is parallel with a longitudinal axis a-a of the collapsible plastic cylinder (FIG. 1), and passes through the center of the finger recess 23 of the lower portion 15 of the closure cap 13. The labeling has indicia 33 which is centered on or is opposite to a visually desired graphics portion of the labeling. The indicia is aligned with or opposite to the imaginary surface line 31. The labeling may be applied by adhesively securing or otherwise affixing it to the collapsible plastic cylinder, screen printed on the surface 3, or otherwise conventionally applied. A collapsible plastic cylinder 1, prior to filling, is illustrated in FIG. 4, showing the indicia 33 of the labeling on the front of the cylinder. The finger recess 23 of the closure cap 13 also faces toward the front of the cylinder.

Figure 7:
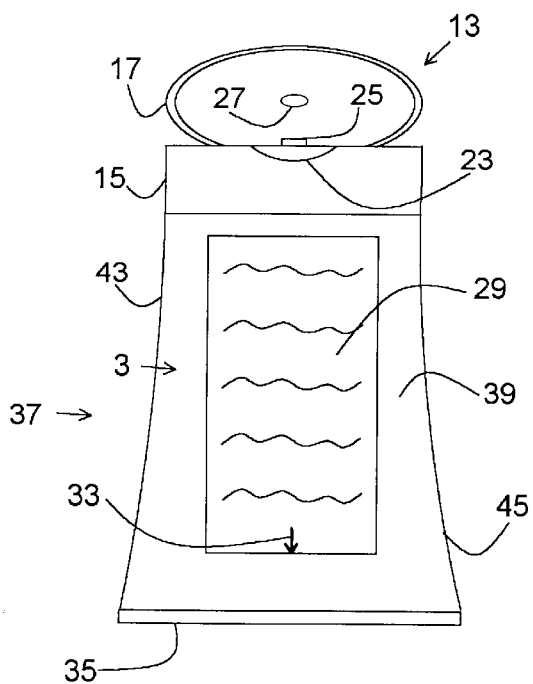
FIG. 7 is a front view of the tube of FIG. 5 with the closure cap in open position.
Figure 8:
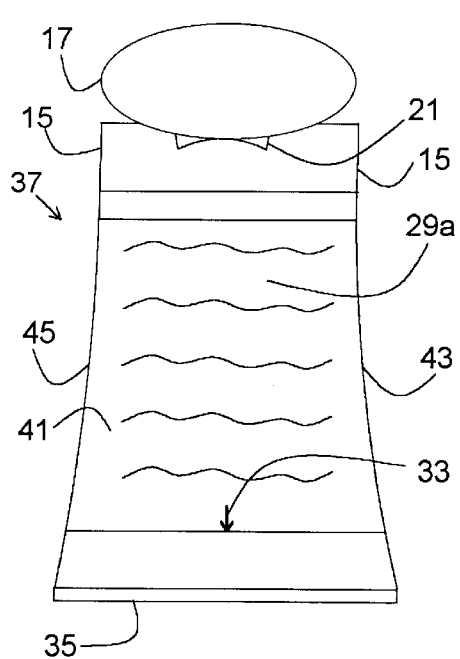
FIG. 8 is a rear view of the tube of FIG. 5 with the closure cap in open position, and with a wrap-around label containing indicia located at the rear wall.

While FIG. 7 shows the labeling 29 applied to what would be the front relatively flat wall 39 of a tube, the labeling may optionally be applied to what would be the rear relatively flat wall 41, provided that the indicia 33 is opposite to the imaginary surface line 31, which passes through the center of finger recess 23 of the lower portion 15 of the closure cap and is parallel to the longitudinal axis of the cylinder. FIG. 8 illustrates a wrap-around label 29a with indicia 33 on the rear relatively flat wall 41. The indicia 33 is provided on the label 29a and sealing of the collapsible plastic cylinder 1 is effected to form a seal 35 in a direction perpendicular to the referencing plane defined by the center of the finger recess 23 and longitudinal axis a-a (FIG. 1).

Figure 5:
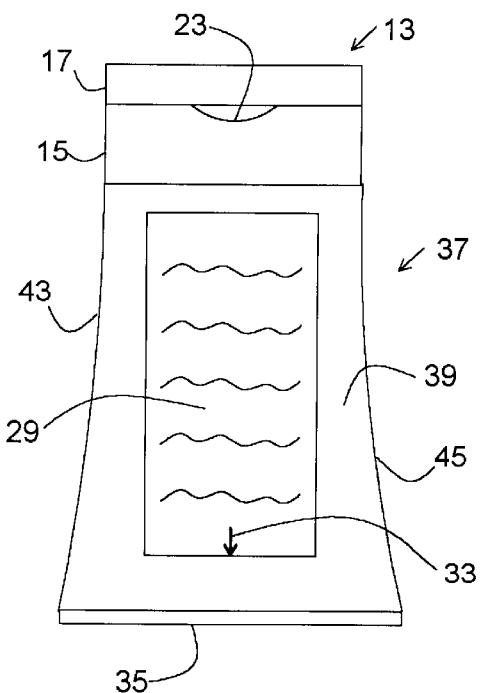
FIG. 5 is a front view of the collapsible plastic cylinder after filling of the cylinder and sealing of the open end so as to form a filled collapsible tube.
Figure 6:
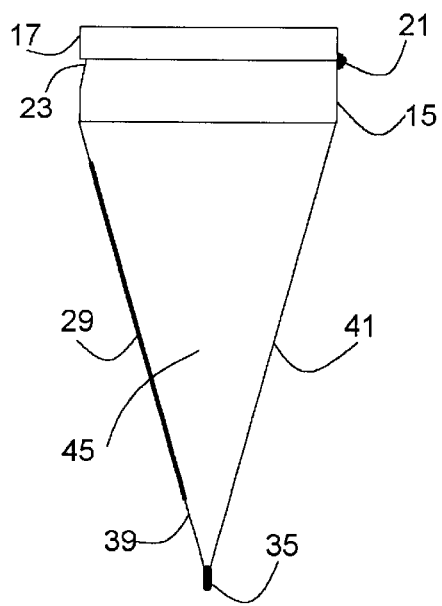
FIG. 6 is a side view of the collapsible tube of FIG. 5.

According to the present method the open end 7 of the collapsible plastic cylinder 1, after filling with the contents to be dispensed therefrom, is sealed, such as by plastic welding, to form a seal 35 in the direction described above, by alignment of a sealer with the indicia 33. The seal 35 causes the collapsible plastic cylinder 1 to form a tube 37 having two relatively flat walls, front wall 39 and back wall 41, with two thinner rounded side walls 43 and 45 (FIGS. 5 and 6). As is seen in FIG. 5, the relatively flat walls 39 and 41, which contain the visually desirable portion of the labeling are centrally aligned with respect to the finger recess 23, so that the user automatically grips the tube 37 with either of the flat walls 39 and 41 disposed towards the user, usually the front wall 39, so that the visually desirable portion of the label is directly exposed to the user.

What is claimed is:

1. A method of forming an open ended squeezable plastic tube arranged for filling with, sealing and dispensing of material, the tube having a hinged closure cap with a finger recess, so as to assure that a visually desirable portion of labeling is aligned centrally relative to the finger recess, comprising:

providing a collapsible elongated plastic cylinder having an outer surface, a head with a dispensing aperture at one end, and being open at the other end, the head having means for engagement with a hinged closure cap for the dispensing aperture;

securing a hinged closure cap on the head, the hinged closure cap having a lower portion attached to the head and an upper portion attached to the lower portion by a hinge, with a finger recess in an outer wall of the lower portion opposite the hinge; and then, applying labeling to the outer surface of the collapsible elongated plastic cylinder between the hinged closure cap and the open end thereof, the labeling having indicia thereon, which is centered on or opposite to a visually desirable portion of the labeling, aligned with or opposite to an imaginary surface line which is parallel with a longitudinal axis of the collapsible elongated plastic cylinder and passes through a center of the finger recess of the closure cap, with the open end of the collapsible elongated cylinder, after filling with contents to be dispensed therefrom, arranged to be sealed in a direction perpendicular to a plane defined by the center of said finger recess and said longitudinal axis, by alignment of sealing means with said indicia, to form a filed squeezable plastic tube.

2. The method of forming an open ended squeezable plastic tube as defined in claim 1 wherein said labeling is applied by adhesively securing the same to the outer surface of the elongated cylinder.

3. The method of forming an open ended squeezable plastic tube as defined in claim 1 wherein said labeling is applied by screen printing on the outer surface of the elongated cylinder.

4. The method of forming an open ended squeezable plastic tube as defined in claim 1 wherein the means on the head for engagement with the closure cap comprises threads which mate with threads of the hinged closure cap.

5. The method of forming an open ended squeezable plastic tube as defined in claim 1 wherein said labeling is a wrap-around label applied to the outer surface of the collapsible plastic cylinder.

6. The method of forming an open ended squeezable plastic tube as defined in claim 5 wherein said indicia of said labeling is on a wall thereof opposite said finger recess of said closure cap.

7. The method of forming an open ended squeezable plastic tube as defined in claim 1 wherein said labeling is applied to the outer surface of the collapsible plastic cylinder with the indicia of the labeling on a wall thereof aligned with said finger recess of said closure cap.

8. The method of forming an open ended squeezable plastic tube as defined in claim 1 wherein said labeling is applied to the outer surface of the collapsible plastic cylinder with the indicia of the labeling on a wall thereof opposite said finger recess of said closure cap.

9. A method of forming a filled squeezable plastic tube for dispensing of material, the tube having a hinged closure cap with a finger recess, with a visually desirable portion of the labeling aligned centrally relative to the finger recess, comprising:

providing a collapsible elongated plastic cylinder having an outer surface, and a head with a dispensing aperture at one end, being open at the other end, and the head having means for engagement with a hinged closure cap for the dispensing aperture;

securing a hinged closure cap on the head, the hinged closure cap having a lower portion attached to the head and an upper portion attached to the lower portion by a hinge, with a finger recess in an outer wall of the lower portion opposite the hinge;

then, applying labeling to the outer surface of the collapsible elongated plastic cylinder, between the hinged closure cap and the open end thereof, the labeling having indicia thereon centered on or opposite to a visually desirable portion of the label said indicia aligned with or opposite to an imaginary surface line on the cylinder which is parallel with a longitudinal axis of the collapsible elongated plastic cylinder and passes through a center of the finger recess of the closure cap, filling said collapsible elongated plastic cylinder with contents to be dispensed therefrom; and then, sealing the open end of the collapsible elongated plastic cylinder in a direction perpendicular to a plane defined by said center of the finger recess and said longitudinal axis, by alignment of the indicia with sealing means, to form a filled squeezable plastic tube.

10. The method of forming a filled squeezable plastic tube as defined in claim 9 wherein the open end of said tube is sealed by welding of the plastic material at said open end.

11. The method of forming a filled squeezable plastic tube as defined in claim 9 wherein said labeling is applied by adhesively securing the same to the outer surface of the elongated cylinder.

12. The method of forming a filled squeezable plastic tube as defined in claim 9 wherein said labeling is applied by screen printing on the outer surface of the elongated cylinder.

13. The method of forming a filled squeezable plastic tube as defined in claim 9 wherein said labeling is a wrap-around label applied to the outer surface of the collapsible plastic cylinder.

14. The method of forming a filled squeezable plastic tube as defined in claim 13 wherein said indicia of said labeling is on a wall of said tube opposite said finger recess of said closure cap.

15. The method of forming a filled squeezable plastic tube as defined in claim 9 wherein said labeling is applied to the outer surface of the collapsible plastic cylinder and the indicia is on a wall thereof aligned with said finger recess of said closure cap.

16. The method of forming a filled squeezable plastic tube as defined in claim 9 wherein said labeling is applied to the outer surface of the collapsible plastic cylinder and the indicia is on a wall thereof opposite said finger recess of said closure cap.

* * * * *